(12) United States Patent
Stahl (10) Patent No.: US 8,672,117 B2
(45) Date of Patent: Mar. 18, 2014

(54) CONTINUOUS MOTION INLINE FEEDER

(75) Inventor: Keenan W. Stahl, Glenwood City, WI (US)

(73) Assignee: Bosch Packaging Technology, Inc., New Richmond, WI (US)

( * ) Notice: Subject to any disclaimer, the term of this patent is extended or adjusted under 35 U.S.C. 154(b) by 911 days.

(21) Appl. No.: 12/756,683

(22) Filed: Apr. 8, 2010

(65) Prior Publication Data

US 2010/0281823 A1 Nov. 11, 2010

Related U.S. Application Data

(60) Provisional application No. 61/168,127, filed on Apr. 9, 2009.

(51) Int. Cl.
*B65B 23/14* (2006.01)
*B65G 47/08* (2006.01)

(52) U.S. Cl.
USPC ............. 198/418.2; 198/418.1; 198/456; 198/457.02; 53/237; 53/247; 53/252; 414/798.6; 414/798.9

(58) Field of Classification Search
USPC ............. 198/418.1, 418.2, 426, 456, 457.02, 198/575, 631.1; 53/48.5, 237, 247, 250, 53/252; 414/798.2, 798.5, 798.6, 798.9
See application file for complete search history.

(56) References Cited

U.S. PATENT DOCUMENTS

| | | | |
|---|---|---|---|
| 3,315,783 A | 4/1967 | Nadherny | |
| 4,098,392 A * | 7/1978 | Greene | 198/419.3 |
| 4,250,693 A * | 2/1981 | Andersson | 53/543 |
| 4,611,705 A * | 9/1986 | Fluck | 414/798.9 |
| 5,052,544 A * | 10/1991 | Anderson | 198/456 |
| 5,095,684 A * | 3/1992 | Walker et al. | 53/443 |
| 5,369,942 A * | 12/1994 | Olson | 53/566 |
| 5,388,389 A * | 2/1995 | Tisma | 53/473 |
| 5,501,064 A | 3/1996 | Ingram et al. | |
| 5,502,950 A * | 4/1996 | Moncrief et al. | 53/448 |
| 5,711,137 A * | 1/1998 | Moncrief et al. | 53/534 |

(Continued)

FOREIGN PATENT DOCUMENTS

| | | |
|---|---|---|
| EP | 0 004 248 A1 | 9/1979 |
| EP | 0 242 017 A1 | 10/1987 |

(Continued)

OTHER PUBLICATIONS

International Search Report and Written Opinion mailed Aug. 4, 2010.

(Continued)

*Primary Examiner* — Douglas Hess
(74) *Attorney, Agent, or Firm* — Merchant & Gould P.C.

(57) ABSTRACT

An inline product feeder for a packaging line and related methods are disclosed. In one example, an inline product feeder includes a product input line configured to receive a contiguous supply of products and configured to guide the products in continuous motion along a path of travel. The inline product feeder also includes a packaging line configured to receive separated groups of the products from the product input line. The inline feeder further includes a feeder unit configured to separate groups of products from the contiguous supply of products in the product input line and move the group of products into the packaging line, each of the separated groups of products including a predetermined number of products from the product input line.

17 Claims, 11 Drawing Sheets

(56) References Cited

U.S. PATENT DOCUMENTS

| | | | | |
|---|---|---|---|---|
| 5,727,365 | A * | 3/1998 | Lashyro et al. | 53/448 |
| 5,755,552 | A * | 5/1998 | Iwasaka et al. | 414/797.9 |
| 5,893,701 | A * | 4/1999 | Pruett | 414/798.2 |
| 5,942,188 | A * | 8/1999 | Lepper et al. | 422/62 |
| 6,058,679 | A * | 5/2000 | Ziegler et al. | 53/448 |
| 6,105,338 | A * | 8/2000 | Kalany et al. | 53/252 |
| 6,170,237 | B1 * | 1/2001 | Wipf | 53/455 |
| 6,314,337 | B1 * | 11/2001 | Marcum | 700/216 |
| 6,711,878 | B1 * | 3/2004 | Paselsky et al. | 53/252 |
| 6,834,755 | B2 * | 12/2004 | Jay | 198/418.6 |
| 6,901,726 | B2 * | 6/2005 | Huppi et al. | 53/473 |
| 7,121,066 | B2 * | 10/2006 | Rompa | 53/516 |
| 7,228,954 | B2 * | 6/2007 | DePaso | 198/448 |
| 7,503,157 | B2 * | 3/2009 | Ford | 53/461 |
| 7,559,737 | B2 * | 7/2009 | Ray et al. | 414/792.9 |
| 7,721,509 | B2 * | 5/2010 | Vissers | 53/252 |
| 7,726,463 | B2 * | 6/2010 | Aronsson | 198/419.3 |
| 8,015,778 | B2 * | 9/2011 | Tischhauser | 53/475 |
| 8,025,142 | B2 * | 9/2011 | Alexander et al. | 198/370.08 |
| 8,191,890 | B2 * | 6/2012 | Franzone et al. | 271/149 |
| 2004/0173959 | A1 | 9/2004 | Jay | |

FOREIGN PATENT DOCUMENTS

| | | |
|---|---|---|
| EP | 1 359 099 A2 | 11/2003 |
| EP | 2 197 745 | 6/2010 |
| FR | 2 620 689 A1 | 3/1989 |

OTHER PUBLICATIONS

European Search Report for Application No. 13161958.7 mailed Aug. 1, 2013.

* cited by examiner

CONTINUOUS MOTION INLINE FEEDER

CROSS-REFERENCE TO RELATED APPLICATION

The present application claims priority to U.S. Provisional Patent Application No. 61/168,127, filed Apr. 9, 2009, the disclosure of which is hereby incorporated by reference in its entirety.

TECHNICAL FIELD

The present disclosure is related to an inline feeder. In particular, the present disclosure is related to a continuous motion inline feeder, such as can be used in biscuit or cracker feeding applications.

BACKGROUND

Inline feeders are typically used in packaging lines to segment and wrap collections of products. For example products that are individual, separable, and uniformly sized can be fed into an inline feeder, which in turn separates the products into uniform groups for packaging. Typical products packaged using an inline feeder can include biscuits, crackers, or other dry foods that are linearly packaged.

Existing inline feeders used in packaging lines for these food products receive a contiguous linear supply of the products. The linear supply of products is separated by a mechanical unit sized to select a constant, predetermined number of products for each package, separate that group of products from the linear supply, and route it toward a component that applies packaging. In certain units, the package unit-sized number of products is moved into a secondary linear supply line leading from the inline feeder to additional packaging modules (e.g. as required for wrapping or otherwise processing the segmented supply of products).

Existing inline feeders typically require the contiguous input feed of products to be paused while the mechanical unit separates each group of products. This pause allows the mechanical separation unit to cleanly separate a group of products and route that group to the secondary linear supply line. However, by requiring the input feed of products to be paused, throughput of products in the packaging lines is limited. Furthermore, existing mechanical units used for segmenting the input feed are highly dependent upon the thickness or size of products received, and are not easily adjustable for different products or package sizes.

For these and other reasons, improvements are desirable.

SUMMARY

In accordance with the following disclosure, the above and other problems are addressed by the following:

In a first aspect, an inline product feeder is disclosed. The inline product feeder includes a product input line configured to receive a contiguous supply of products and configured to guide the products in continuous motion along a path of travel. The inline product feeder also includes a packaging line configured to receive separated groups of the products from the product input line. The inline feeder further includes a feeder unit configured to separate groups of products from the contiguous supply of products in the product input line and move the group of products into the packaging line, each of the separated groups of products including a predetermined number of products from the product input line.

In a second aspect, a method of supplying products in a packaging line is disclosed. The method includes receiving a contiguous supply of products along a product input line, the contiguous line of products in continuous motion along a path of travel. The method further includes, while the line of products remains in continuous motion along the path of travel, retracting a feeder plate residing in the path of travel to a position alongside the supply of products in the path of travel, the feeder plate including a surface engaged with an end product in the supply of products while the feeder plate is within the path of travel. The method also includes, while the line of products remains in continuous motion along the path of travel, moving the feeder plate along a side of the path of travel to select a group of products from the contiguous line of products. The method further includes, while the line of products remains in continuous motion along the path of travel, actuating the feeder plate to separate the group of products from the contiguous line of products and move the group of products into a packaging line.

In a third aspect, a product packaging system is disclosed. The product packaging system includes a product input line configured to receive a contiguous supply of products, the product input line configured to guide the products in continuous motion along a path of travel. The product packaging system also includes a packaging line configured to receive separated groups of the products from the product input line and route the groups of products to a product packager. The product packaging system further includes a feeder unit configured to separate groups of products from the contiguous supply of products in the product input line and move the group of products into the packaging line, the separated group of products including a predetermined number of products from the product input line. The product packaging system includes a product packager configured to apply packaging to the groups of products received along the packaging line.

In a fourth aspect, an inline biscuit feeder assembly is disclosed. The inline biscuit feeder assembly includes a product input line configured to receive a contiguous supply of biscuits and configured to guide the biscuits in continuous motion along a path of travel. The assembly further includes a packaging line configured to receive separated groups of the biscuits from the product input line. The assembly also includes a feeder unit configured to separate groups of biscuits from the contiguous supply of biscuits in the product input line and move the group of biscuits into the packaging line, the separated group of biscuits including a predetermined number of products from the product input line. The feeder unit includes a feeder plate including a support surface and a guide surface, as well as a product support plate defining an end of the path of travel of products along the product input line and configured to support the biscuits in an upright position in the absence of the feeder plate. The feeder unit also includes an alignment plate positioned along a side of the path of travel of the biscuits in the product input line, the alignment plate maintaining a constant relative position to the product support plate and guiding the biscuits along the path of travel toward the support plate. The feeder unit includes a robot arm assembly including a plurality of drive arms connected to a linkage point on the feeder plate. The support surface is approximately parallel to the product support plate and configured to support the biscuits in an upright position in the absence of the product support plate, and wherein the guide surface is approximately parallel to the guide plate and configured to guide the group of biscuits into the packaging line.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a continuous motion inline feeder, such as can be used in biscuit or cracker feeding applications. The continuous motion inline feeder of the present disclosure is adjustable and can accommodate products of varying thicknesses. The inline feeder of the present disclosure is referred to as a "continuous motion" inline feeder in that the received products (e.g. biscuits, crackers, or other foods/objects) are received from a continuous-motion product input line of contiguous (i.e. immediately adjacent) products, as opposed to a stop-motion line in which the product input line must be paused to separate products into product groups for packaging. Via use of an inline feeder having a continuous motion input, throughput in a packaging system, and in the inline feeder in particular, can theoretically be increased by up to approximately 30% over existing technologies.

Figure 1:
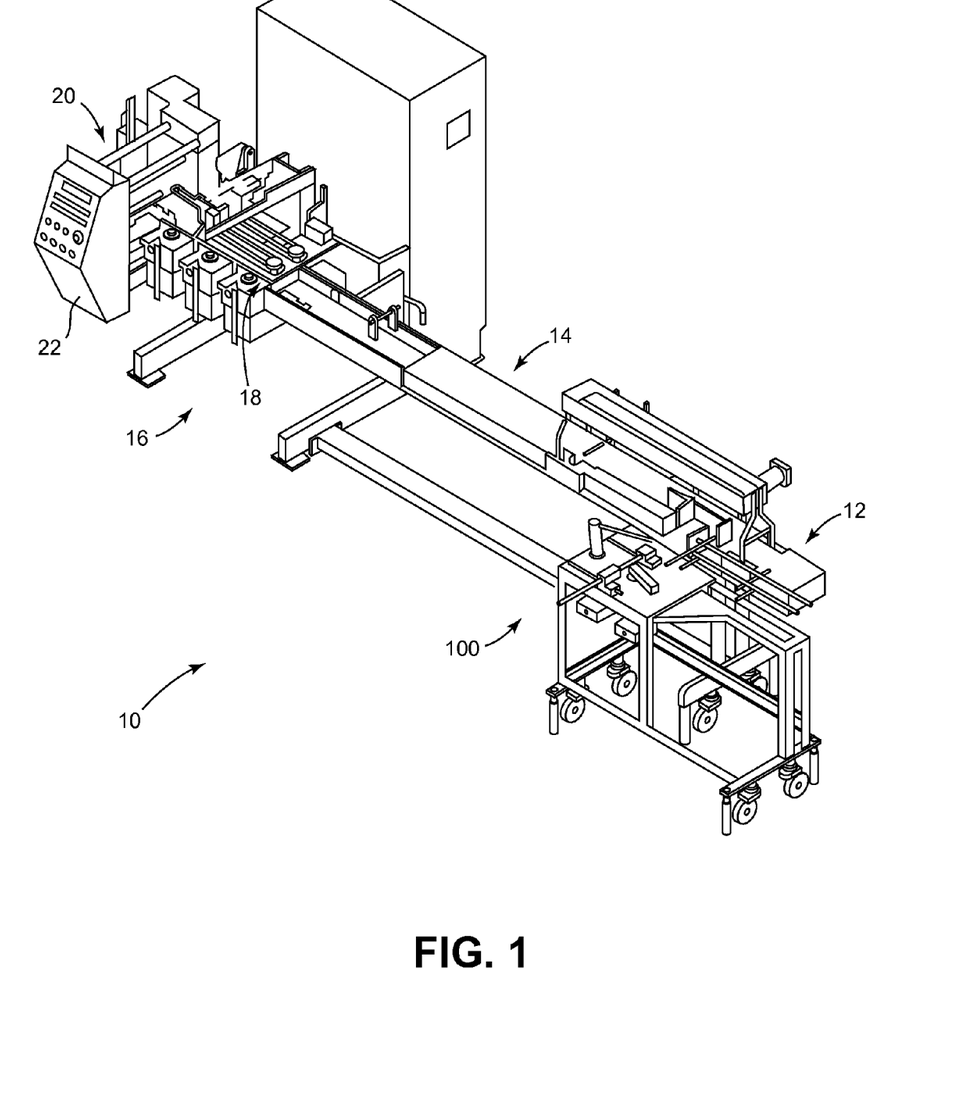
FIG. 1 is a perspective view of an example product packaging system in which aspects of the present disclosure can be implemented.

Referring now to FIG. 1, a perspective view of an example product packaging system 10 is shown in which aspects of the present disclosure can be implemented. The product packaging system 10 is generally configured to package "on-edge" products, meaning products that are fed into the packaging system standing on an edge as opposed to in a flat configuration. Products that can be packaged using the product packaging system 10 are therefore rigid or semi-rigid, and are easily separable. In certain embodiments, the products can be food products, such as biscuits or crackers.

The product packaging system 10 includes a product input line 12 and a product packaging line 14 separated by an inline product feeder 100. The product input line 12 is configured to receive a contiguous supply of a product, and to guide the products in a continuous motion along the path of travel defined by the product input line 12. While passing along the product input line 12, the products remain in the "on-edge" configuration. The product input line 12 can receive the products for packaging from a human placing the products into the input line, from an external mechanical operation, or other means.

The inline product feeder 100, described in greater detail below in conjunction with FIGS. 2-11, generally separates the products received on the product input line 12 into packageable groups of predetermined size (also known as "slugs"). The inline product feeder 100 moves each of the separated groups, or slugs, from the product input line 12 to the product packaging line 14. The inline product feeder 100 includes a number of features allowing configuration relative to the size of the product and number of products per package, as explained in further detail below. Although in the embodiment shown the inline product feeder 100 is illustrated as placed on a separable, movable cart adjacent to the product input line 12 and product packaging line 14, it could equivalently be located as a fixed arrangement in this location. Various arrangements of an inline product feeder are shown below in FIGS. 2-11.

The product packaging line 14 receives grouped products from the inline product feeder 100, still in the "on-edge" configuration, and transports those grouped products remote from the inline product feeder toward a product packager 16. The product packager 16 receives the groups of products from the product packaging line 14, and applies a product package to each group of products.

In certain embodiments, the product packager 16 applies a gusseted wrapper over the group of products, as typically provided in the case of biscuit or cracker packaging. In such embodiments, including that shown in FIG. 1, the product packager 16 optionally includes a side belt assembly 18 and a gusseting assembly 20. The side belt assembly applies packaging around the on-edge products, while the gusseting assembly 20 applies end gusset seals to the package, completing the enclosure of the products. Other packaging configurations could be applied to the group of products as well.

A control module 22 can be included in the product packaging system 10 as well, and provides electronic control to the various modules of the system. For example, the control module 22 can control the speed of the packaging line or can monitor various conditions in the packaging line (e.g. status, failures, or blockages). Other controls can be added at the control module as well. Furthermore, additional components can be included in the packaging system 10 overall, depending upon the type of packaging to be applied and the type of product being packaged.

Figure 2:
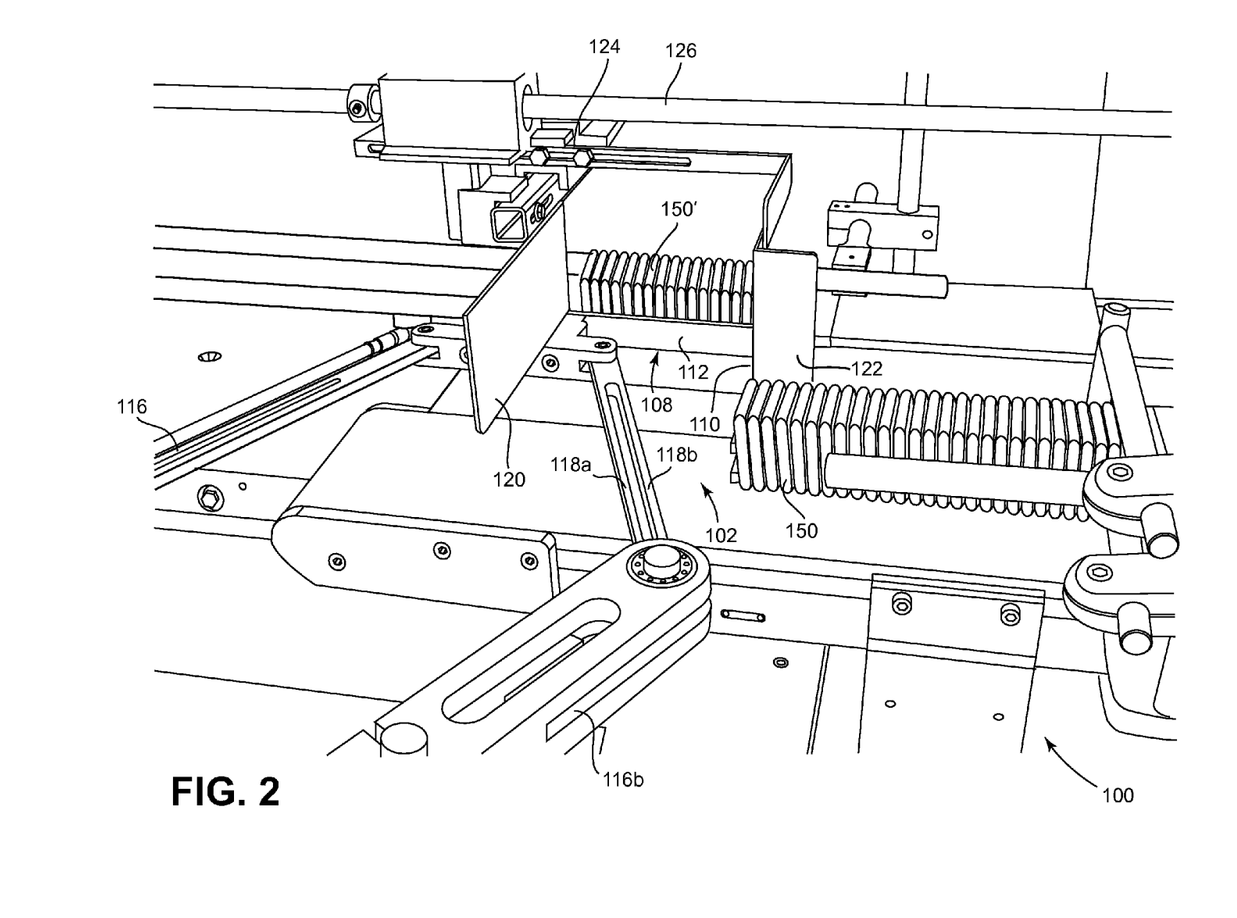
FIG. 2 is a side perspective view of an inline product feeder, according to a possible embodiment of the present disclosure.

FIG. 2 is a side perspective view of an inline product feeder 100, according to a possible embodiment of the present disclosure. The inline product feeder 100 can be, in certain embodiments, used in a packaging system such as the one shown above in FIG. 1. In the embodiment shown, the inline product feeder includes a product input line 102 (e.g. corresponding to the product input line 12 above) that is shown to receive a contiguous supply of products (shown as biscuits 150). The product input line 102 guides the products along a path of travel, such as by placing them on a conveyor belt or other conveyance mechanism.

A feeder unit 104 separates the biscuits received from the contiguous supply in the product input line 102 into groups, and routes the separated groups to a packaging line 106 (e.g. corresponding to the packaging line 14 of FIG. 1, above). In the embodiment shown, the feeder unit 104 includes a feeder plate 108 having a support surface 110 and a guide surface 112. The support surface 110 is configured to support the products (e.g. biscuits 150) in an upright position, while the guide surface is configured to guide the products from the product input line 102 to the packaging line 106.

In the embodiment shown, the feeder plate is connected to a robot arm assembly 114, which includes a pair of drive arms 116a-b (116a not shown but analogous to 116b and 316a, below)) connected to the feeder plate 108 via linkages 118a-b, respectively. At the junction of drive arm 116a and linkage 118a, a stationary wheel (seen in further detail in the embodiment shown in FIGS. 4-11, below) provides further linkages for guiding the position and orientation of the feeder plate when moving between the product input line and packaging line. The drive arms 116a-b are independently controlled and moveable about independent radii to control the two-dimensional position of the feeder plate 108.

In the embodiment shown, the feeder unit 104 also includes a product support plate 120 and an alignment plate 122, which assist in guiding and supporting the product groups as it moves between the product input line 102 and packaging line 104. The product support plate 120 defines an end of the input line 102, and is movable along an adjustable length path to provide support to the upright products 150 when they are disengaged from the support surface of the feeder plate 108. The product support plate is positioned above the feeder plate 108, such that both components can engage the products 150 as they move through a product separation and feeder cycle. In the embodiment shown, the product support plate 120 is connected to a moveable control unit 124 mounted along a rail 126 above the product input line and packaging line; however, other control arrangements are possible as well. The alignment plate 122 is fixed in positional relationship with the product support plate 120, and provides a backstop against which the feeder plate 108 can press the products. Generally, the product support plate 120 is approximately parallel to the support surface 110 of the feeder plate 108, while the alignment plate 122 is approximately parallel to the guide surface 112.

The distance between the support plate 120 and the alignment plate 122, along with the overall length of the feeder plate 108, determines the size of the separated group of products (shown as the biscuits 150' within the packaging line 104), and consequently the number of products per package. By adjusting the distance between the support plate 120 and the alignment plate 122 using an adjustment mechanism 124, an operator can easily change the size of the package used in conjunction with the inline product feeder 100. This adjustment can be performed manually, or by a control system (for example, control module 22 of FIG. 1) capable of moving the adjustment mechanism 124.

In operation, the inline product feeder 100 can be initiated alongside other components of a product packaging system. In most cases, the inline product feeder 100 will be hand loaded with bulk product into the product input line 102. The inline product feeder 100 will portion the products and automatically insert them into the product packaging line 106. The group of products (a.k.a. the "slug") will be contained on all four sides to prevent it from falling over. As the slug is being wrapped by other product packaging components, control of the product will be transferred from the feeder 100 to the packaging (e.g. packaging film) and any side belts used to contain and urge the product forward. Prior to gusseting and formation of a cross seal (e.g., a lengthwise seal along the product group), control of the product will be transferred from the side belts to the gusseting feature.

In certain embodiments, the inline product feeder 100 and a related packaging machine (e.g. system 10 of FIG. 1) can be provided with sensors for automatic starting and stopping of the machine based upon incoming product supply. A computer-based control architecture can also be used for receiving sensor feedback, and for performing calculations relating to machine parameters, product motion profiles, and other features. For example, this control architecture can be incorporated into control module 22 of FIG. 1, and can be used to adjust the speed of product motion, the size of the slug to be packaged, the size of the individual product, the type of packaging to be applied, or other product or packaging information.

Figure 3:
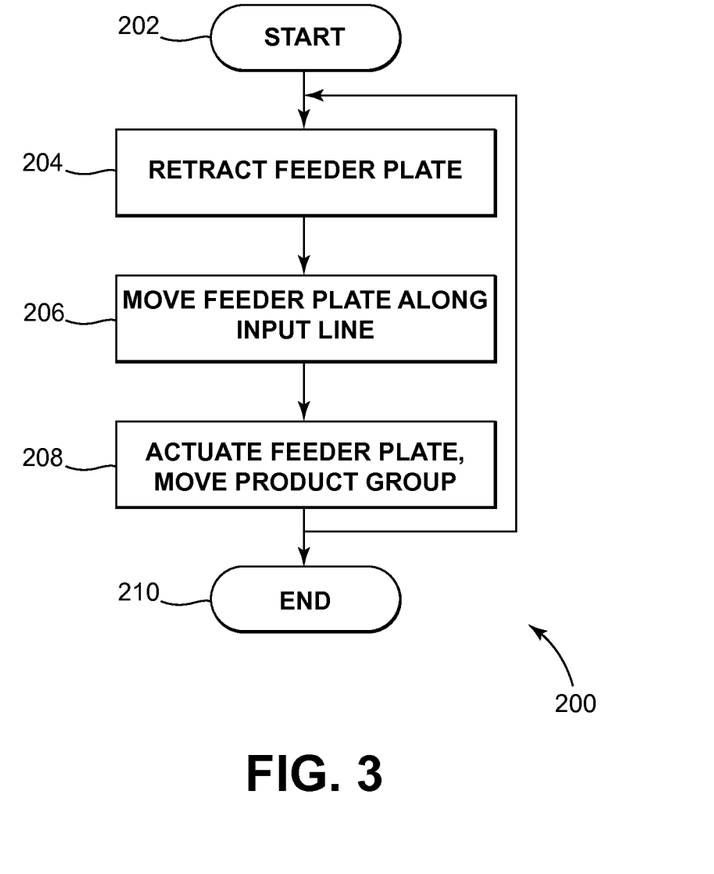
FIG. 3 is a flowchart of methods and systems of operation for supplying products in a packaging line using an inline product feeder, according to a possible embodiment of the present disclosure.

FIG. 3 is a flowchart of methods and systems of operation for supplying products in a packaging line using an inline product feeder, according to a possible embodiment of the present disclosure. The flowchart illustrates a process 200 by which a continuous motion inline product feeder can operate according to certain embodiments of the present disclosure. The process 200 is instantiated at a start operation 202, which corresponds to initial start-up of an inline product feeder. Startup of the inline product feeder can include, for example, initialization of a number of variables relating to product packaging, such as product size, slug size, speed of motion of products along a product input line, and other features. Upon startup of the inline product feeder, a contiguous line of products (in "on-edge" orientation) can be introduced into a product input line, and is moved along a path of travel in continuous motion. Various inline product feeders can be used, such as the one shown in FIG. 3, or others illustrated below in FIGS. 4-11.

A number of repeated-operation modules are executed while the product continuously moves along the product input line. A feeder plate retraction module 202 corresponds to retracting a feeder plate away from the product input line, to a position alongside the supply of products in the path of travel. A feeder plate movement module 204 corresponds to moving the feeder plate along a side of the path of travel to select a group of products from the contiguous line of products. An actuation module 206 corresponds to actuating the feeder plate to separate the group of products from the contiguous line of products and move the group of products into a packaging line. These modules can be cyclically performed by an input product feeder to segment and relocate groups of products for packaging. Upon completion of a desired number of packaging operations, a packaging system and related inline product feeder can be shut down, corresponding to end operation 210. Once the packaging system and related inline product feeder are shut down (or paused), a user can also edit settings using a control system (e.g. control system 22 of FIG. 1) to change the configuration of the inline product feeder, for example to accommodate a different product to be packaged or a different size or type of packaging.

Now referring to FIGS. 4-11, a further embodiment of an inline product feeder 300 is disclosed, which is useable to implement aspects of the present disclosure within the context of a packaging system such as the one illustrated in FIG. 1. Overall features of the inline product feeder 300 are described in conjunction with FIG. 4, and operation of the product feeder according to the process of FIG. 3 is illustrated by the sequential actions shown in FIG. 4-11.

Figure 4:
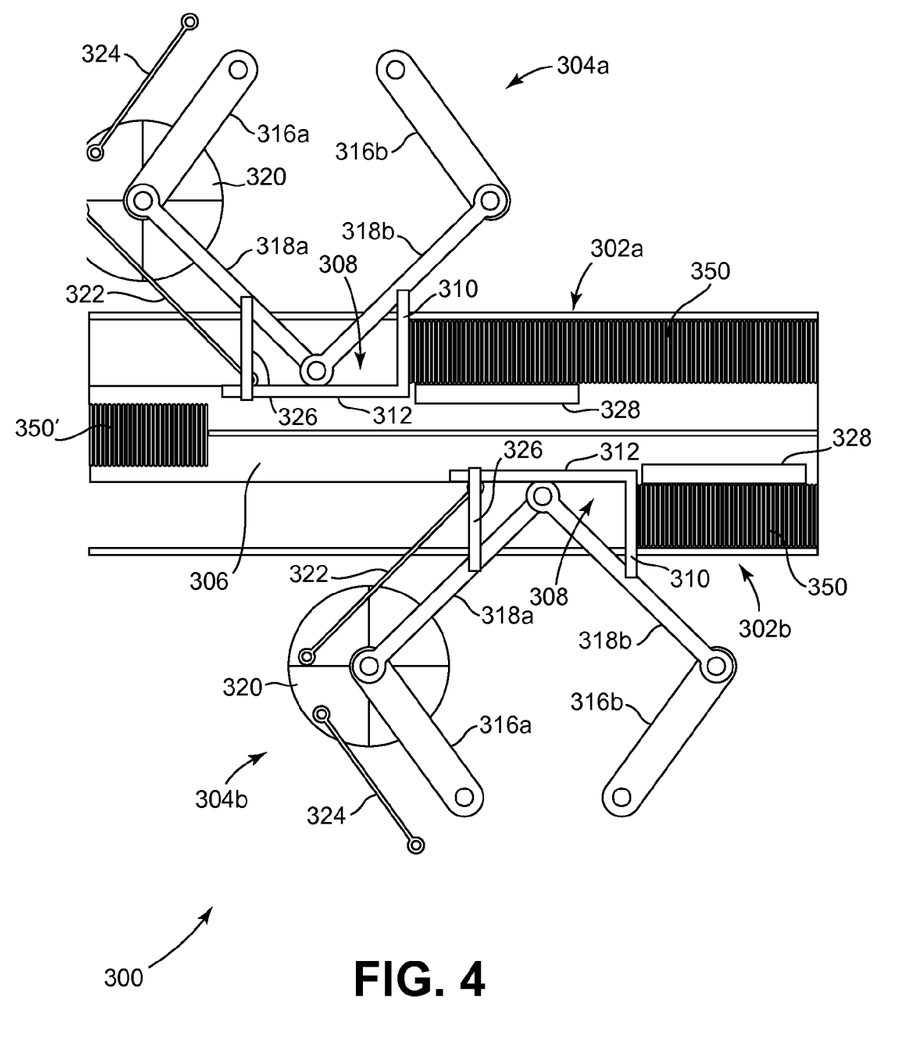
FIG. 4 is a top schematic view of an inline product feeder according to a possible embodiment of the present disclosure.

FIG. 4 is a top schematic view of the inline product feeder 300, and is configured to operate on various products 350. As with the previous embodiment of FIG. 2, the products 350 can be any of a number of "on-edge" rigid or semi-rigid products, including food products such as biscuits or crackers. Hence, the inline product feeder 300 can be referred to equivalently as an inline biscuit feeder. In the embodiment shown, the system 300 provides greater throughput as compared to the embodiment of FIG. 2 by increasing the number of input lines provided to the packaging system. For example, as shown, the inline product feeder includes a pair of product input lines 302a-b that are shown to receive a contiguous supply of products (shown as biscuits 350). The product input lines 302a-b guide the products along separate paths of travel, such as by placing them on a conveyor belt or other conveyance mechanism.

Feeder units 304a-b each separate the biscuits received in the contiguous lines 302a-b, respectively, into groups, and route the separated groups to a packaging line 306. The feeder units 304a-b include a feeder plate 308 having a support surface 310 and a guide surface 312, whose operation and arrangement are equivalent to that described for surfaces 110 and 112 of the feeder plate 108 of FIG. 2. Although two product input lines 302a-b are shown in this embodiment, it is understood that additional product input lines and feeder units could be employed as well.

Analogously to FIG. 2, each feeder plate 308 is connected to a robot arm assembly 314, which includes a pair of drive arms 316a-b connected to the feeder plate 308 via linkages 318a-b, respectively. At the junction of drive arm 316a and linkage 318a, a stationary wheel 320 connects to further linkages 322, 324 for guiding the position and orientation of the feeder plate when moving between the product input line and packaging line. The drive arms 316a-b are independently controlled and moveable about independent radii to control the two-dimensional position of the feeder plate 308. As shown in FIG. 4, each feeder plate 308 is positioned to support the products received in the product input lines 302a-b.

The feeder unit 304 also includes a product support plate 326 and an alignment plate 328, whose position and arrangement are analogous to that described above with respect to elements 120, 122 of FIG. 2.

Figure 5:
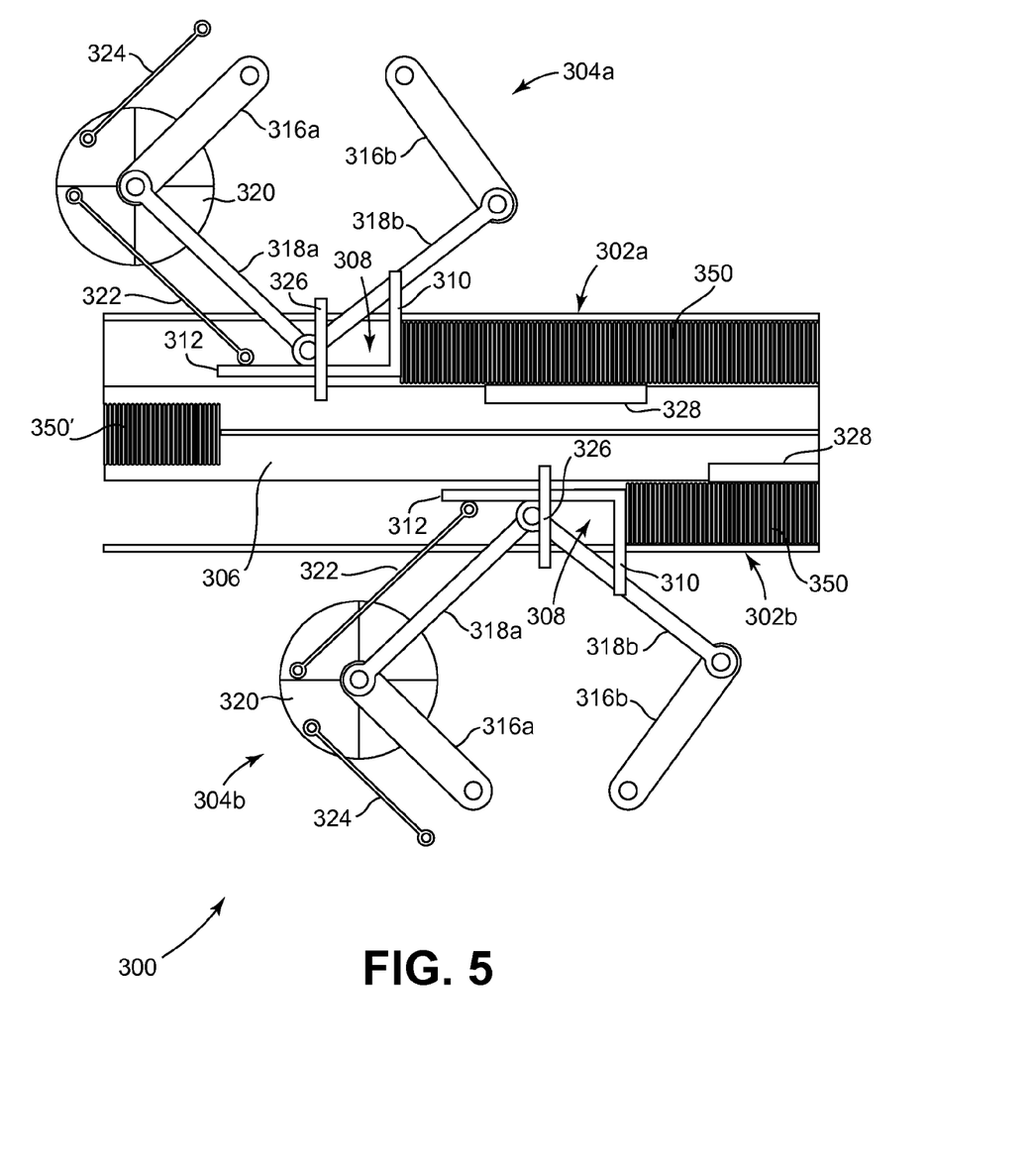
FIG. 5 is a top schematic view of the inline product feeder of FIG. 4 after initiating a product grouping cycle by retracting the feeder plate.
Figure 6:
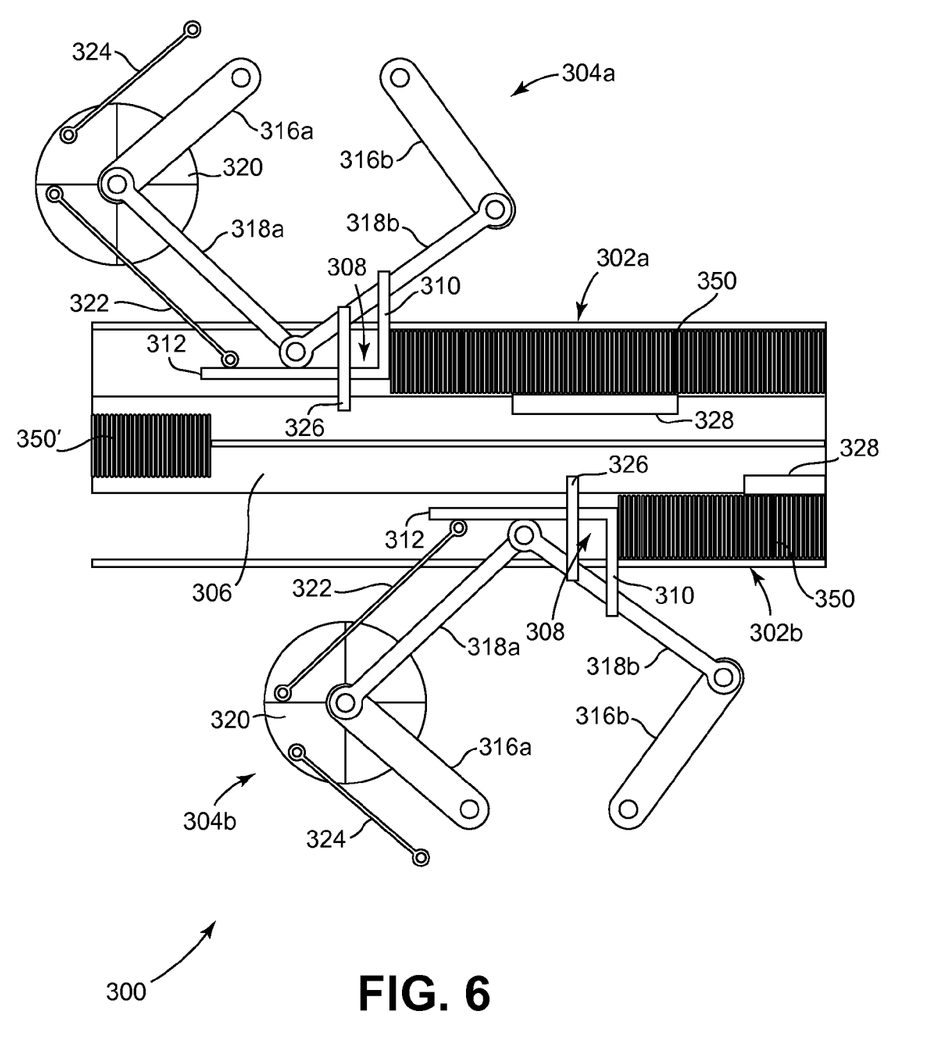
FIG. 6 is a further top schematic view of the inline product feeder of FIG. 4 during a product grouping cycle, illustrating further retraction of the feeder plate.

The arrangement of the feeder plates 308 in FIG. 4 corresponds to an initial position of the feeder plate during operation of a process to receive products into a packaging system, as described in conjunction with FIG. 3. FIGS. 5-6 illustrate sequential operations upon initiation of the inline product feeder, in which the feeder plate 308 is retracted away from the product input line. As shown, the feeder plate retracts to a position behind the support plate 326 relative to the product 350 (shown in FIG. 7), such that, once the feeder plate moves behind the support plate the support plate resides adjacent to the products and maintains the on-edge configuration of the products. The feeder plate 308 continues to move to a position alongside the supply of products in the path of travel (shown in FIG. 7), corresponding to execution of the feeder plate retraction module 202. Specifically, in the embodiment shown in FIGS. 5-7, the control arms 316a-b are configured to rotate in opposing directions, away from one another, to cause the linkages 318a-b, 322, 324 and wheel 320 to cooperate and correspondingly retract the feeder plate 308 from the product input lines 302a-b.

Figure 7:
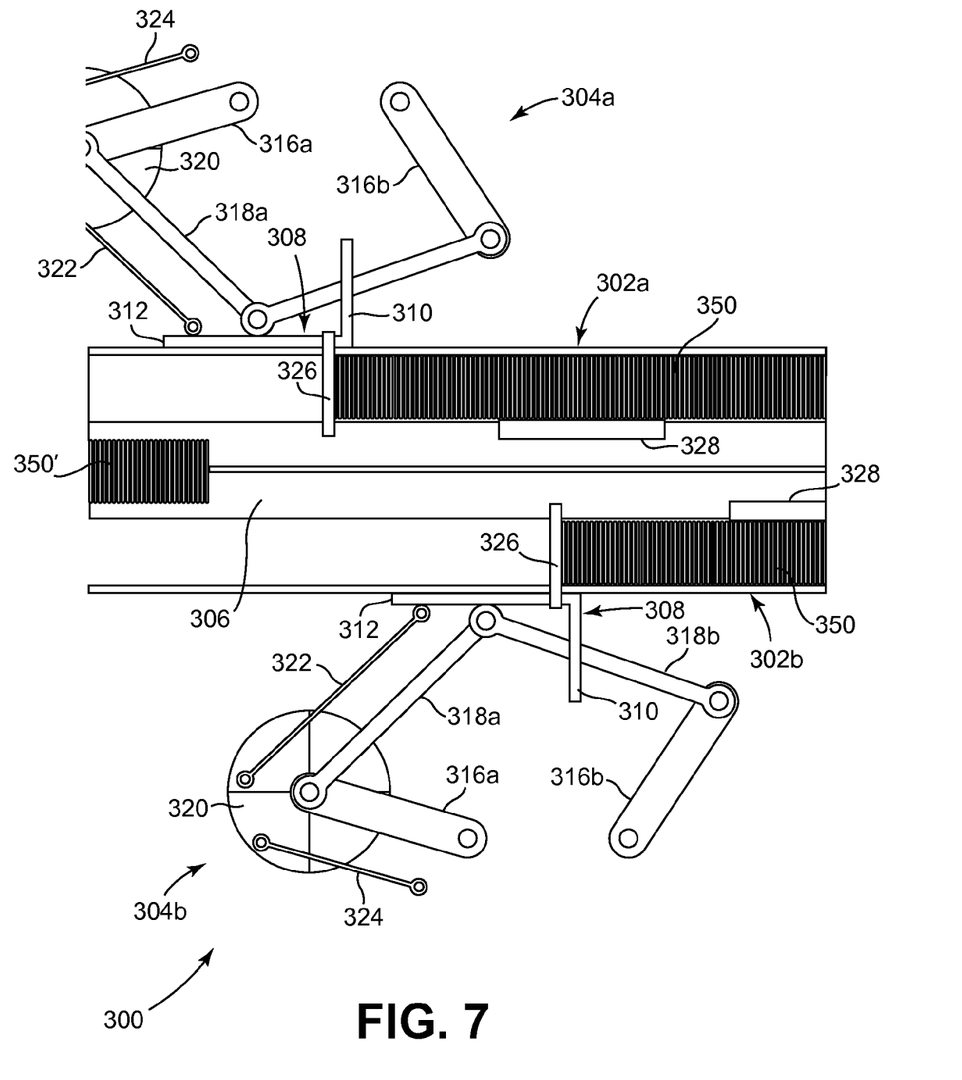
FIG. 7 is a further top schematic view of the inline product feeder of FIG. 4 during a product grouping cycle, illustrating movement of the feeder plate along a side of the input line.
Figure 8:
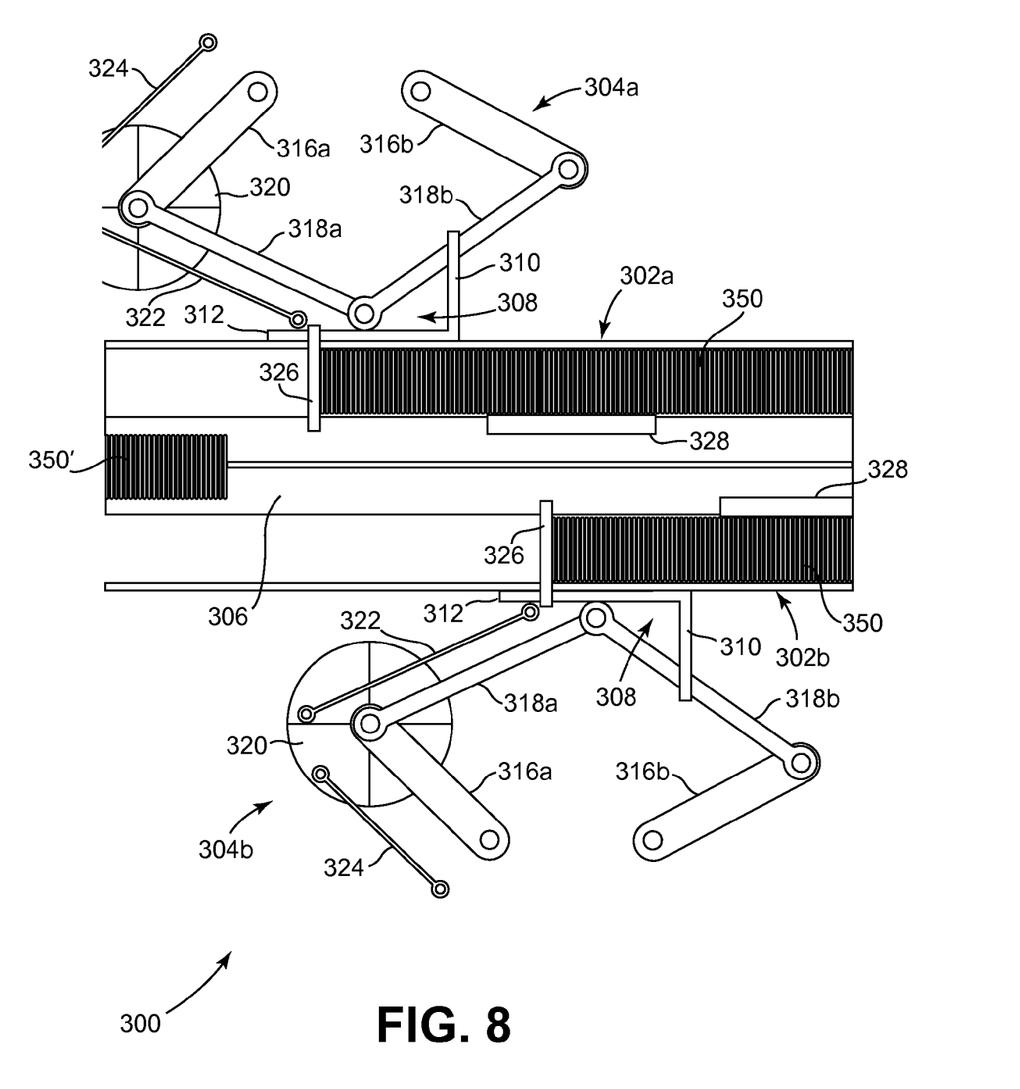
FIG. 8 is a further top schematic view of the inline product feeder of FIG. 4 during a product grouping cycle, illustrating further movement of the feeder plate along a side of the product input line.

FIGS. 7-8 illustrate sequential operations performed once the feeder plate 308 has been retracted out of the path of travel of the products 350. As shown, the feeder plate 308 is moved along a side of the path of travel of the products to select a group of products, or slug, from the contiguous line of products. The slug, whose size is determined by (1) the size of the feeder plate 308 and (2) the distance between the product support plate 326 and the alignment plate 328, is the predefined slug size to be packaged, as defined in a control system and by the mechanical setup of the inline product feeder 300. This operation corresponds to execution of the feeder plate movement module 204 of FIG. 3. Specifically, in the embodiment shown in FIGS. 7-8, the control arms 316a-b are configured to rotate in the same direction (opposite to the direction of travel of the product along the product input lines 302a-b) to cause the linkages 318a-b, 322, 324 and wheel 320 to cooperate and correspondingly slide the feeder plate 308 along the product input lines 302a-b.

Figure 9:
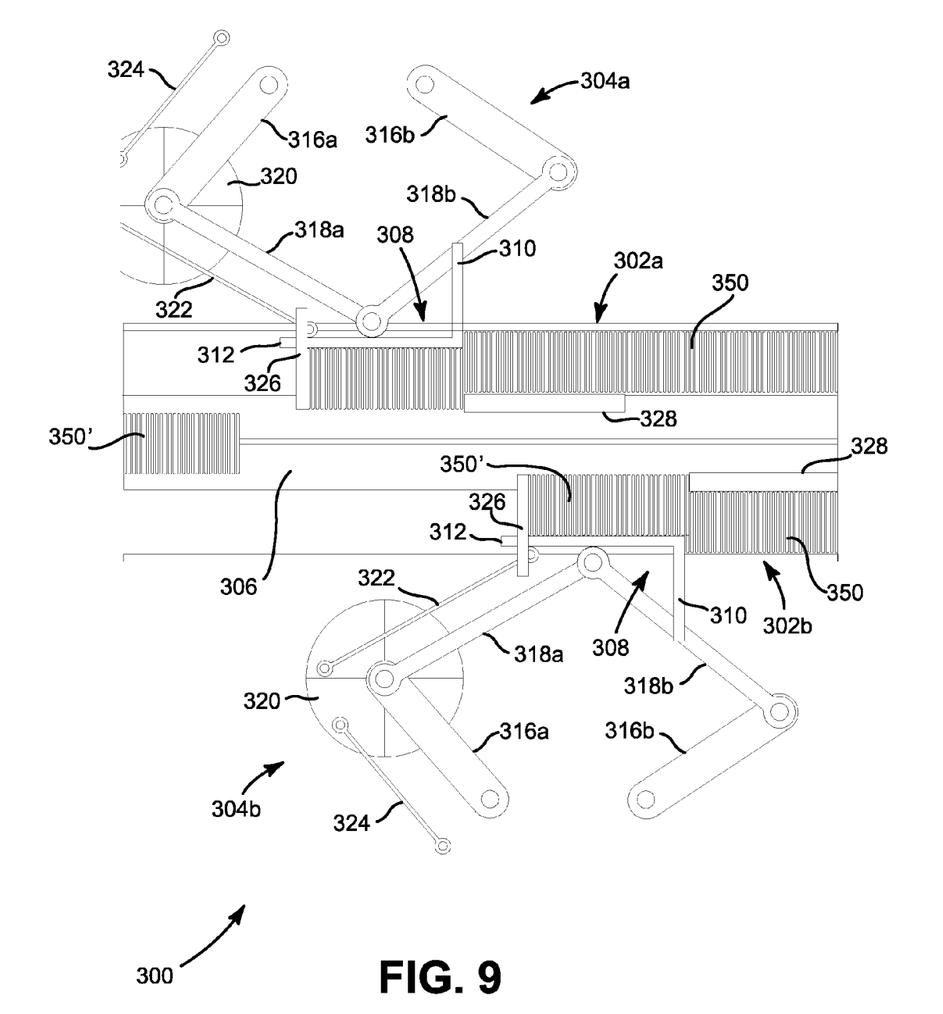
FIG. 9 is a further top schematic view of the inline product feeder of FIG. 4 during a product grouping cycle, illustrating initial actuation of the feeder plate to separate a group of products from the product input line.
Figure 10:
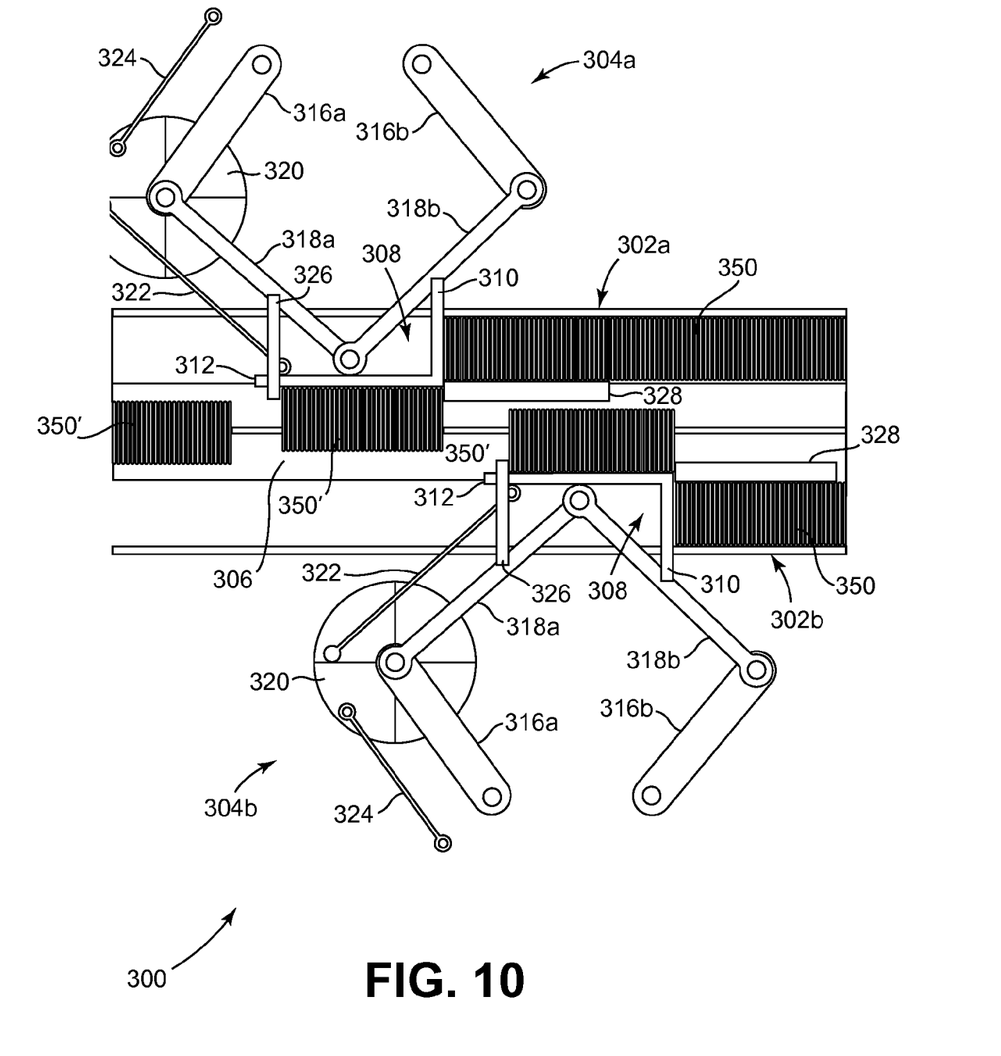
FIG. 10 is a further top schematic view of the inline product feeder of FIG. 4 during a product grouping cycle, illustrating further actuation of the feeder plate to separate a group of products from the product input line.
Figure 11:
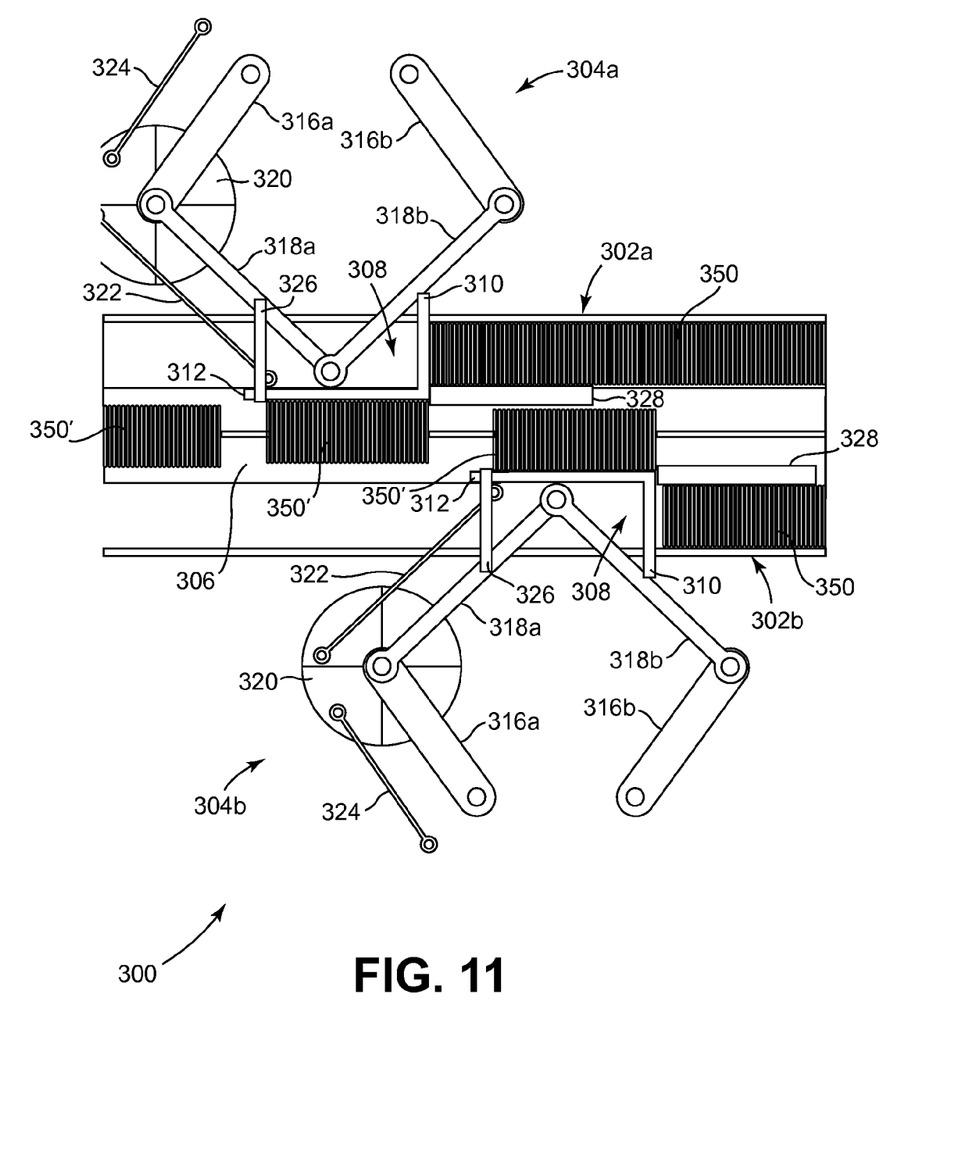
FIG. 11 is a further top schematic view of the inline product feeder of FIG. 4 during a product grouping cycle, illustrating completed actuation of the feeder plate to separate a group of products from the product input line and deliver the products to a packaging line.

FIGS. 9-11 illustrate sequential operations performed once the feeder plate has been moved alongside the predefined slug of products. Each feeder plate 308 is actuated to move each respective group of products 350 (separated groups illustrated as 350', and 350", respectively) from the associated product input line 302a-b to the packaging line 306. This operation corresponds to execution of the actuation module 206 of FIG. 3. Specifically, in the embodiment shown in FIGS. 9-11, the control arms 316a-b are configured to rotate in opposite directions, toward one another, to cause the linkages 318a-b, 322, 324 and wheel 320 to cooperate and correspondingly actuate the feeder plate 308, pushing the feeder plate and therefore moving a slug of products from the product input lines 302a-b to the product packaging line 306.

Following movement of the separated groups 350' into the packaging line 306 from each of the product input lines 302a-b, the process can restart, with the groups 350' travelling along the packaging line 306 to a point clear of the feeder plates 308 by the time a subsequent group is to be guided from each of the product input lines (i.e. FIG. 4 corresponds to FIG. 11 in the absence of a prior cycle).

Referring now to FIGS. 4-11 generally, although the movement of the inline product feeder 300 is illustrated with a pair of product input lines 302a-b, an equivalent process can be performed using more or fewer product input lines and appropriately configured feeder units 304a-b. Additionally, in the embodiment shown, the feeder units 304a-b operate in unison; in alternative embodiments, the feeder units could be configured to alternate in operation or otherwise coordinate to move groups 350' of products from product input lines 302a-b to the packaging line 306. The feeder units 304a-b also are configured to select and separate groups of products of a common size; in alternative embodiments, the feeder units could separate groups of products having different or varying sizes.

Furthermore, and relating to FIGS. 1-11 generally, by grouping products using inline product feeders (e.g., feeders 100, 300) of the present disclosure, it is possible to improve throughput in a packaging system by avoiding stalling of one or more product input lines, thereby improving throughput. Furthermore, the configurability of the product input lines relative to differing sizes of products, slugs, and different packaging types can reduce downtime of the packaging systems described herein, also improving throughput.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An inline product feeder comprising:
   a product input line configured to receive a contiguous supply of products, the product input line configured to guide the products in continuous motion along a path of travel during packaging;
   a packaging line configured to receive separated groups of the products from the product input line;
   a feeder unit configured to separate a group of products from the contiguous supply of products in the product input line and move the group of products into the packaging line, the separated group of products including a predetermined number of products from the product input line, wherein the feeder unit includes:
      a feeder plate;
      a product support plate, the product support plate defining an end of the path of travel of products along the product input line and configured to support the products in an upright position in the absence of the feeder plate; and
      an alignment plate positioned along a side of the path of travel of products in the product input line, the alignment plate maintaining a constant relative position to the product support plate and guiding the products along the path of travel toward the support plate: and
   wherein the feeder plate includes a support surface and a guide surface, the support surface approximately parallel to the product support plate and configured to support the products in an upright position in the absence of the product support plate, the guide surface approximately parallel to the guide plate and configured to guide the group of products into the packaging line.

2. The inline product feeder of claim 1, further comprising a robot arm assembly connected to the feeder plate.

3. The inline product feeder of claim 2, wherein the robot arm assembly includes a plurality of drive arms connected to a linkage point on the feeder plate.

4. The inline product feeder of claim 1, wherein the length of the guide surface at least partially defines the size of the group of products.

5. The inline product feeder of claim 1, further comprising:
   a second product input line configured to receive a second contiguous supply of products, the product input line configured to guide the products in continuous motion along a second path of travel; and
   a second feeder unit configured to separate groups of products from the second contiguous supply of products in the second product input line and move the groups of products into the packaging line.

6. The inline product feeder of claim 1, wherein the contiguous supply of products includes biscuits.

7. A method of supplying products in a packaging line, the method comprising:
   receiving a contiguous supply of products along a product input line, the contiguous line of products in continuous motion along a path of travel during packaging;
   while the line of products remains in continuous motion along the path of travel, retracting a feeder plate residing in the path of travel to a position alongside the supply of products in the path of travel, the feeder plate including a surface engaged with an end product in the supply of products while the feeder plate is within the path of travel;
   while the line of products remains in continuous motion along the path of travel, moving the feeder plate along a side of the path of travel to select a group of products from the contiguous line of products; and
   while the line of products remains in continuous motion along the path of travel, actuating the feeder plate to separate the group of products from the contiguous line of products and move the group of products into a packaging line.

8. The method of claim 7, further comprising, while moving the feeder plate along a side of the path of travel, engaging the end product in the supply of products with a product support plate.

9. The method of claim 7, further comprising initializing a plurality of product packaging settings associated with an inline product feeder prior to receiving the contiguous supply of products along the product input line.

10. A product packaging system comprising:
    a product input line configured to receive a contiguous supply of products, the product input line configured to guide the products in continuous motion along a path of travel;
    a packaging line configured to receive separated groups of the products from the product input line and route the groups of products to the product packager;
    a feeder unit configured to separate groups of products from the contiguous supply of products in the product input line and move the group of products into the packaging line, the separated group of products including a predetermined number of products from the product input line, wherein the feeder unit includes:
       a feeder plate;
       a product support plate, the product support plate defining an end of the path of travel of products along the product input line and configured to support the products in an upright position in the absence of the feeder plate; and
       an alignment plate positioned along a side of the path of travel of products in the product input line, the alignment plate maintaining a constant relative position to the product support plate and guiding the products along the path of travel toward the support plate; and
    a product packager configured to apply packaging to the groups of products received along the packaging line;
    wherein the feeder plate of the feeder unit includes a support surface and a guide surface, the support surface approximately parallel to the product support plate and configured to support the products in an upright position in the absence of the product support plate, the guide surface approximately parallel to the guide plate and configured to guide the group of products into the packaging line.

11. The product packaging system of claim 10, further comprising a control unit communicatively connected to the product input line, packaging line, feeder unit, and product packager, the control unit providing electronic control of the product packaging system.

12. The product packaging system of claim 10, further comprising:
    a second product input line configured to receive a second contiguous supply of products, the second product input line configured to guide the products in continuous motion along a second path of travel; and
    a second feeder unit configured to separate groups of products from the second contiguous supply of products in the second product input line and move the separated groups of products into the packaging line.

13. An inline biscuit feeder assembly comprising:
- a product input line configured to receive a contiguous supply of biscuits, the product input line configured to guide the biscuits in continuous motion along a path of travel;
- a packaging line configured to receive separated groups of the biscuits from the product input line; and
- a feeder unit configured to separate a group of biscuits from the contiguous supply of biscuits in the product input line and move the group of biscuits into the packaging line, the separated group of biscuits including a predetermined number of biscuits from the product input line, the feeder unit including:
  - a feeder plate including a support surface and a guide surface;
  - a product support plate, the product support plate defining an end of the path of travel of products along the product input line and configured to support the biscuits in an upright position in the absence of the feeder plate;
  - an alignment plate positioned along a side of the path of travel of the biscuits in the product input line, the alignment plate maintaining a constant relative position to the product support plate and guiding the biscuits along the path of travel toward the support plate; and
  - a robot arm assembly including a plurality of drive arms connected to a linkage point on the feeder plate;
  - wherein the support surface is approximately parallel to the product support plate and configured to support the biscuits in an upright position in the absence of the product support plate, and wherein the guide surface is approximately parallel to the guide plate and configured to guide the group of biscuits into the packaging line.

14. The inline biscuit feeder assembly of claim 13, further comprising:
- a second product input line configured to receive a second contiguous supply of biscuits, the product input line configured to guide the biscuits in continuous motion along a second path of travel; and
- a second feeder unit configured to separate a group of products from the second contiguous supply of products in the second product input line and move the group of biscuits into the packaging line.

15. The inline biscuit feeder assembly of claim 14, wherein the feeder unit and the second feeder unit operate in unison.

16. The inline biscuit feeder assembly of claim 13, wherein the feeder unit is configured to repeat operation to sequentially separate groups of biscuits from the contiguous supply of biscuits in the product input line.

17. The inline biscuit feeder assembly of claim 16, wherein the sequentially separated groups of biscuits include a common predetermined number of biscuits.

* * * * *